I. E. McGEHEE.
COTTON PICKER HEAD.
APPLICATION FILED MAR. 22, 1920.
1,372,711.
Patented Mar. 29, 1921.
2 SHEETS—SHEET 1.
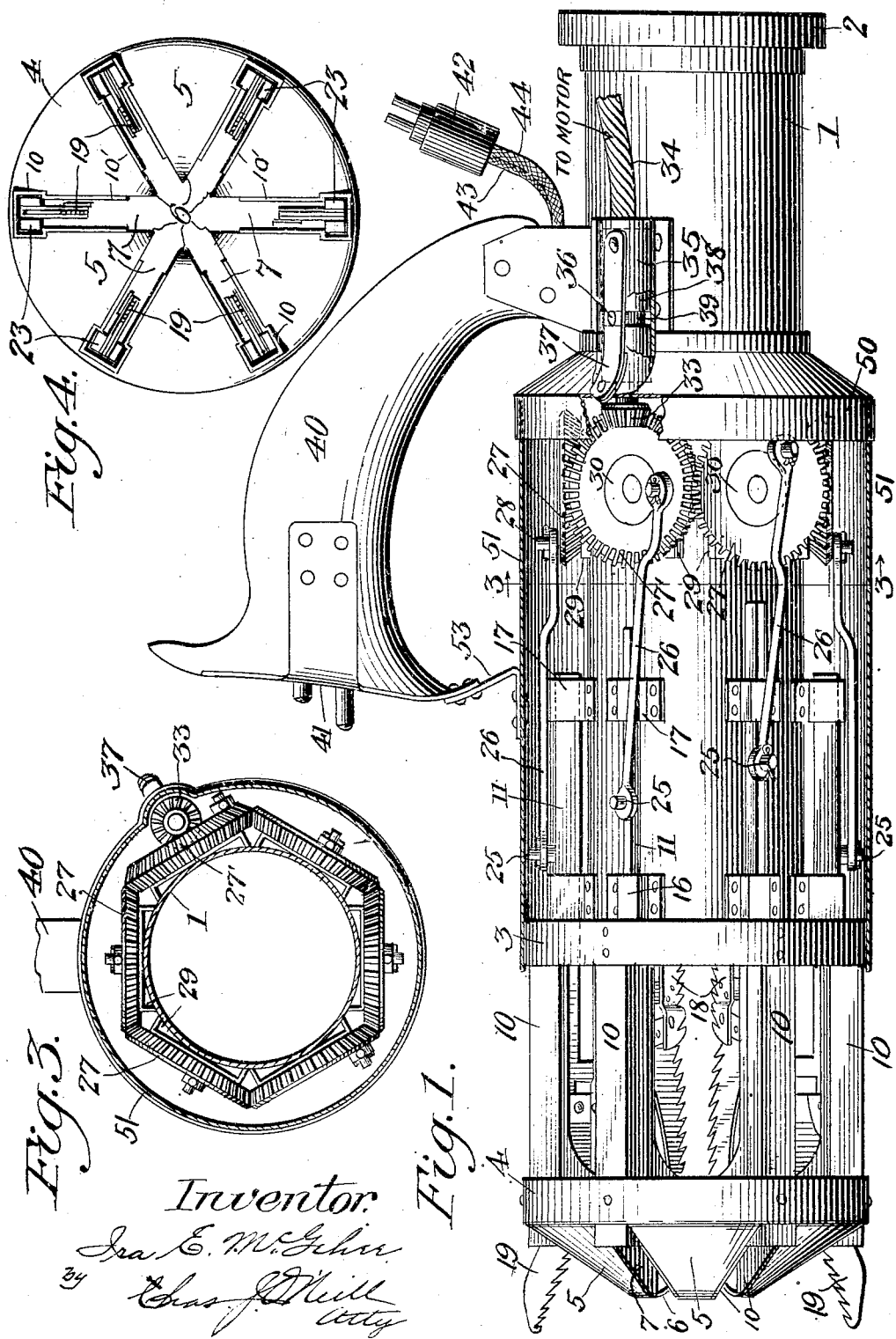
Inventor
Ira E. McGehee
Chas. J. Neill
Atty I. E. McGEHEE.
COTTON PICKER HEAD.
APPLICATION FILED MAR. 22, 1920.
1,372,711.
Patented Mar. 29, 1921.
2 SHEETS—SHEET 2.
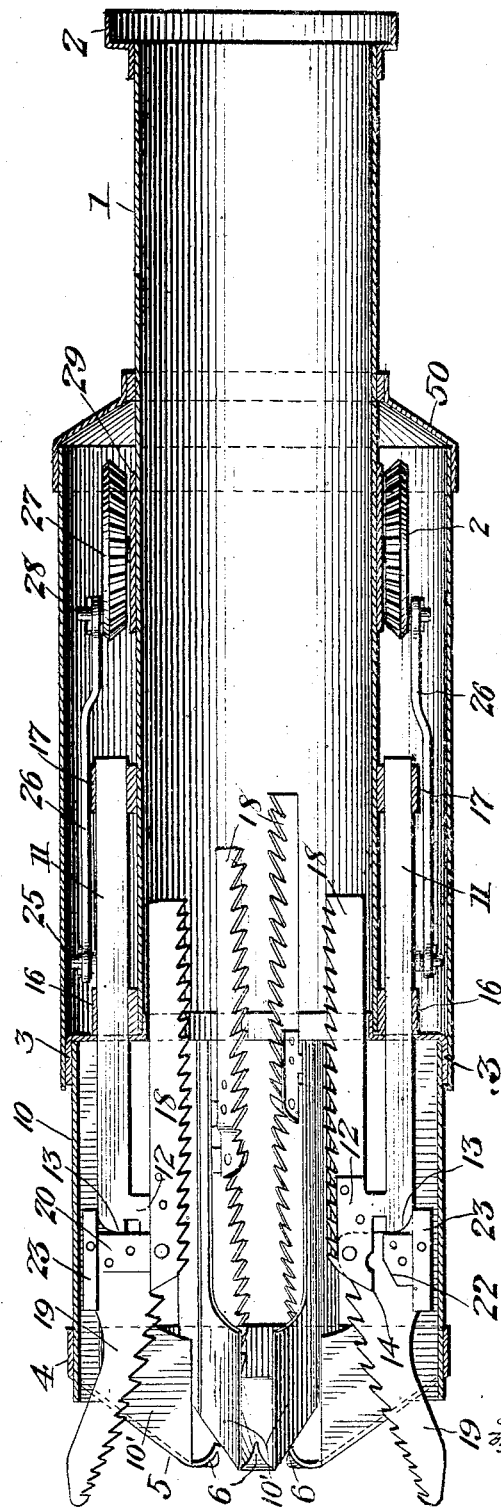
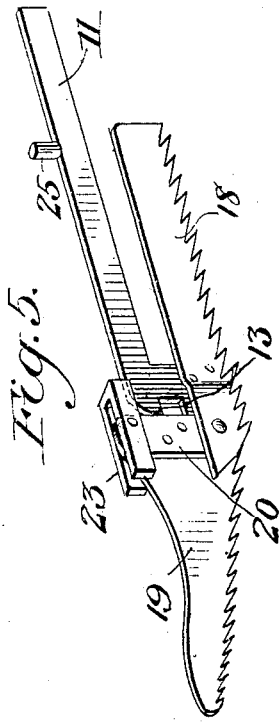
Inventor
Ira E. McGehee
by Chas. J. Neill
Atty.

UNITED STATES PATENT OFFICE.

IRA E. McGEHEE, OF CHATHAM, MISSISSIPPI, ASSIGNOR OF ONE-SIXTH TO MONTFORT JONES, OF MEMPHIS, TENNESSEE, ONE-SIXTH TO MICAJAH P. STURDIVANT, OF GLENDORA, MISSISSIPPI, AND ONE-SIXTH TO J. STEWART WATSON, OF LEXINGTON, MISSISSIPPI.

COTTON-PICKER HEAD.

1,372,711.      Specification of Letters Patent.      Patented Mar. 29, 1921.

Application filed March 22, 1920. Serial No. 367,715.

*To all whom it may concern:*

Be it known that I, IRA E. McGEHEE, a citizen of the United States of America, residing at and whose post-office address is Chatham, county of Washington, State of Mississippi, have invented certain new and useful Improvements in Cotton-Picker Heads; and I do hereby declare the following to be a full, clear, and exact description of the invention, such as will enable others skilled in the art to which it appertains to make and use the same.

This invention relates to improvements in cotton picker heads of the general type shown in my prior Patent, Number 1,196,373, dated August 29, 1916, and has for its object to improve and simplify the construction and mode of operation of the picker fingers and consolidate the same with the conveying members so that the reciprocation of the several sets of fingers effects the gathering of the cotton from the bolls and the automatic conveying of the picked cotton through the support, or conduit, to which the picker head is attached. A further object of the invention is to provide the picker head with a novel form of muzzle or cap at its forward end through which the movable end members of the fingers reciprocate and which is constructed and arranged to exclude foreign materials, such as sticks, leaves, and sections of cotton bolls, from the head, and while admitting ready passage of the cotton fiber through the head. These and other objects and advantages of the invention will be more fully set forth in the following description based upon the accompanying drawings, in which:—

Figure 1 is a side elevation of the picker head.

Fig. 2 is a longitudinal section through the same.

Fig. 3 is a vertical section on line 3, 3, of Fig. 1.

Fig. 4 is a vertical elevation showing the muzzle end of the head.

Fig. 5 is a perspective view of one of the picker fingers.

Referring to the drawings, 1 indicates a tubular support, preferably made of metal, having on its rear end a coupling flange 2 to which may be attached a flexible hose or other suitable means for conveying the gathered cotton to a suitable receptacle. Secured to the forward end of the tubular member 1, is a flanged ring 3, adapted to serve as the support for a series of annularly disposed U-shaped guide members 10, extending longitudinally of the tube or support 1, and in advance of the forward end thereof. The vertical flanges of the guide members 10 are prolonged forwardly and toward the longitudinal axis of the head to constitute vertical guides 10' for the pivoted end members of the picker fingers, to be more specifically described hereinafter.

Secured to the outer ends of the guide members 10, is a substantially conical shaped shield or muzzle comprising an annular flange 4, and face section 5, provided with a central opening and radial slots 7, to receive the flanges 10', and the forward ends of the guides 10. The ends 6 of the middle sections of the muzzle or shield, defined by the radial slots aforesaid, are turned inwardly so as to draw the cotton fiber, as it is gathered, into the head, and, at the same time, to exclude any foreign materials of appreciable size, inasmuch as these inturned ends define the extent of the feed opening into the head.

Mounted in suitable guides, such as 16 and 17, disposed about the outer surface of the tubular member 1, are a series of slides 11, which project through slots in the forward ring 3, and lie within the radial flanges of the guide members 10. Each of the slides 11 constitutes the actuating means for an individual picker finger, so that as the slides are reciprocated longitudinally of the tube or support 1, a similar reciprocatory movement will be imparted to the picker fingers.

Each of the picker fingers comprises a serrated bar 18, of metal, with the teeth thereof directed rearwardly, said bar being rigidly attached to an angular projection 12 formed on the forward end of a slide 11. Near the forward end of the projection 12, is pivoted a picker member 19, having graduated saw teeth on its lower edge projecting rearwardly, the pivotal movement of said picker member 19 being limited to the plane defined by slide 11 and bar 18, the lower limit of movement being determined by stop 22 on one side of the member 19, and a projecting nose 14 on the end of member 12 of the slide 11. The upper limit of movement of the pivoted picker member 19 is determined by the end 13 of the slide 11, which strikes the rear edge of the pivoted member 19.

Pivoted near the rearward and outer edge of the picker member 19, is a U-shaped weight 23, the legs of which straddle said member 19, so that the weight is capable of oscillatory movement about a point substantially above the pivotal axis of the picker member 19. Said weight 23 also acts as an auxiliary guide for its associated picker finger, as said weight is slidably mounted within the flanged guideways 10 so that when the several picker fingers, with their actuator slides 11, are assembled on the support, the bars 18 of the picker fingers extend in radial series within the tube 1, as indicated in Fig. 2, while the several pivoted members 19, of the picker fingers lie within the radially extending flanges 10' of the several guides 10.

The picker fingers are designed to operate in pairs, the members of each pair lying on diametrically opposite sides of the head, and the several pairs of fingers are preferably operated in sequence. Reciprocatory motion, in the order indicated, may be imparted to the several pairs of picker fingers by any appropriate actuating means, which may be either electrical, mechanical, or a combination of the two, it being understood that the reciprocatory motion is sufficiently rapid to cause the outer end sections 19 of the picker fingers to swing on their pivots at each change of direction of movement, due to the inertia of said end members, as will be hereinafter explained. In the form of the apparatus shown each of the slides 11, which is attached to a picker finger, is connected by means of a journal pin 25, with one end of a connecting rod 26, the other end of which engages a crank pin 28, upon the face of the gear wheel 27. The several gear wheels 27 are mounted in a peripheral series on the outer face of the tubular support 1, by means of a series of blocks 29, attached to the tube, each block having an enlarged pintle or bearing 30 fitting a shouldered central opening in the corresponding gear 27, whereby each gear is free to rotate on the bearing 30, but is prevented from moving axially of said bearing. The several gears are of such size that they intermesh successively and form a closed ring, so that movement imparted to one of the gears will be transmitted to all of the others. One of said intermeshing gears is provided with a beveled toothed rim 27' on its upper face, and is adapted to be engaged by a beveled pinion 33 on the end of a flexible shaft 34, which latter is attached to an electric motor (not shown) adapted to be carried in a suitable support by the person operating the picker. The forward end of the shaft 34 is provided with a sleeve 38 engaging a bearing 35 carried by the tubular member 1, said sleeve having a peripheral slot 39, adapted to be engaged by a pin 36, carried by a spring finger 37, mounted on the bearing 35, the end of the pin 36 engaging the groove in the sleeve aforesaid, to retain the pinion 33 in mesh with its mating gear 37.

Secured to the rearward portion of the tubular support 1, is a handle 40, in the forward face of which is mounted a two-button switch 41, adapted to open and close the electric circuit to the motor by means of leads 43, 44, terminating in the coupling member 42.

In order to protect the actuating mechanism of the picker fingers 1, which, as indicated, is mounted on the exterior of the tubular support 1, there is provided a flanged rim 50 secured to the tubular member 1, adapted to receive a cylindrical guard or casing 51, which is preferably made of perforated metal, the rear end thereof sliding within the flange of the member 50 and the outer end resting upon flange 3, the intermediate portion of the guide or casing being attached to the face plate on the handle 40 by means of a bracket 53, as illustrated in Fig. 1.

The operation of the apparatus as thus described, is as follows, it being understood that the coupling 42 is connected up with a source of supply on the one hand and to the motor on the other, which latter may be carried by the operator, or, if desired, suspended upon a suitable trolley or trackway in the field, said motor being coupled to the flexible shaft 34, and the picker head connected to a suitable receptacle for the picked cotton by a tube or conduit connected to the coupling flange 2 on the rear end of the tubular support 1 of the head. When the circuit to the motor is closed at the switch 41, the said motor drives the flexible shaft 34 at a high rate of speed and this imparts rotary motion to the pinion 33 which in turn drives the series of intermeshing gears 27 on the outside of the tubular support 1. The continuous rotary motion of the gears 27 reciprocates the individual slides 11, through connecting rods 26, and each slide 11 correspondingly reciprocates its connecting picker finger. Diametrically opposite picker fingers reciprocate in unison, so that while one pair is being advanced, another pair is being retracted, and the third pair is in intermediate movement. It is essential that the reciprocation of the picker fingers be quite rapid in order to obtain the best results and it is because of this fact that an electric motor for driving the apparatus is particularly effective, and as the power required is low, a small sized motor capable of being carried by the operator will suffice. As each picker finger begins its forward movement, the inertia of the pivoted member 19 constituting the forward portion of the finger, causes said forward portion to swing outward. This movement is aided and rendered more certain by reason of the weight 23, mounted upon the upper portion of the forward section of the picker finger and operating within the corresponding guide 10. During its entire forward travel, therefore, the outer end 19 of the picker finger is held to the outer limit of its pivotal movement, so that the outer ends of the two coöperating picker fingers on opposite sides of the head constitute distended jaws, as illustrated in Figs. 1 and 2. When a given pair of picker fingers reach the end of their outward movement and begin their rearward movement, the inertia of the forward ends 19 of the fingers, augmented by the inertia of the weights 23 secured thereto, cause the picker finger ends 19 to approach each other, each member 19 swinging on its pivotal connection with its supporting bar 18, the swinging movement of each finger end being in a plane radial to the longitudinal axis of the head so that the two co-acting finger ends approach each other and engage the cotton in the boll from opposite sides, and as the two fingers are simultaneously retracted, the cotton fiber is torn from the boll, and drawn into the central opening in the muzzle or shield. As the next pair of picking fingers is advanced and retracted in turn, they seize another portion of the fiber and draw it through the opening in the head and this operation is continued at a very rapid rate of speed, so that the successive portions of fiber drawn into the head force the previously extracted fiber ahead in the form of a loosely wadded mass, and carry the same through the tubular member 1, and the connecting conduit to the bag or other receptacle for the cotton. It will also be noted that during the forward movement of a given set of picker fingers, the outer ends thereof are completely masked or guarded by the radial flanges 10' so that they cannot interfere with the cotton fiber being drawn in by another set of fingers. It will also be observed that the serrated lower edges of the bar members 18 of the several picker fingers also serve to force the accumulated cotton drawn into the head by the outer ends or sections of the picker fingers and force the same rearwardly through the tubular support, but that the teeth on the bars operate freely through the accumulated cotton within the tube when the fingers move forward.

It will be particularly noted that the operating parts of the apparatus are few and simple, are most substantial in structure and do not involve any elements subject to excessive wear, strain or derangement, so that the device may be operated at a high rate of speed, which insures a positive converging movement of the pivoted ends of the picker fingers at the outer end of the reciprocatory movement and an equally positive diverging movement of the ends when the same pair of fingers begins its outward movement, so that the operation of the picker fingers is quite similar to that of the fingers of the human hand, but is much more rapid and certain than the latter could possibly be. It will be seen that the ends of each pair of picker finger members 19, as the fingers reach the outer end of their stroke, are moved from a divergent and extended relation into a convergent, gripping engagement with the fiber in the cotton boll and then quickly retracted, to be immediately followed by a corresponding action by another pair of fingers, and so on, until, in the briefest imaginable interval of time, all of the cotton is stripped from the boll and fed incrementally through the head and into the receptacle provided therefor. As indicated, the operation of the pivoted finger ends is positive and direct, and is independent of any spring action or guiding trackways which are liable to impairment or derangement, and even should the apparatus encounter any obstruction, the effect would be to merely suspend or interrupt the movement of the fingers thereof without imposing any undue strain thereon.

It will be understood that while the particular form of apparatus, including the actuating means therefor, constitutes the desirable and preferred form of the invention, nevertheless, the apparatus is susceptible of various changes and modifications without departing from the spirit of the invention so long as it involves the primary feature of the reciprocating picker fingers with the outer pivoted sections thereof operated in both directions by inertia.

What I claim is:—

1. A cotton picker head comprising a support, multiple sets of picker fingers associated therewith, each finger including a serrated bar having an end section pivoted near its inner and rear edge thereto, and means to impart a sufficiently rapid reciprocatory movement to the several sets of fingers sequentially; to cause the end sections of each set of fingers to approach each other at the outer end of their stroke and to recede from each other at the inner end of their stroke due to the inertia of the said end sections.

2. A cotton picker head comprising a support, multiple sets of picker fingers associated therewith, each finger including a serrated bar having an end section pivoted thereto and weighted outwardly of the pivotal connection, and means to impart a sufficiently rapid reciprocatory movement to the several sets of fingers sequentially; to cause the end sections of each set of fingers to approach each other at the outer end of their stroke and to recede from each other at the inner end of their stroke, due to inertia of the said end sections.

3. A cotton picker head comprising a support, multiple sets of picker fingers associated therewith, each finger including a serrated bar having an end section pivoted thereto, a weight pivoted to each section outwardly of the pivotal connection thereof with the bar, and means to impart a sufficiently rapid reciprocatory movement to the several sets of fingers sequentially; to cause the end sections of each set of fingers to approach each other at the outer end of their stroke and to recede from each other at the inner end of their stroke, due to inertia of the said end sections.

4. A cotton picker head comprising a support, multiple sets of picker fingers associated therewith, each finger including a serrated bar having an end section pivoted thereto, a weight pivoted to each section outwardly of the pivotal connection thereof with the bar, means to impart a sufficiently rapid reciprocatory movement to the several sets of fingers sequentially; to cause the end sections of each set of fingers to approach each other at the outer end of their stroke and to recede from each other at the inner end of their stroke, due to inertia of the said end sections, and means to limit the pivotal movement of each end section.

5. A cotton picker head comprising a tubular support, multiple sets of picker fingers mounted for reciprocatory movement longitudinally of said support, each finger including a serrated bar having an end section pivoted thereto and weighted outwardly of the pivotal connection, guides for the several picker fingers, and means to impart a sufficiently rapid reciprocatory movement to the several sets of fingers sequentially; to cause the end sections of each set of fingers to approach each other at the outer end of their stroke and to recede from each other at the inner end of their stroke, due to inertia of said sections.

6. A cotton picker head comprising a tubular support, multiple sets of picker fingers mounted for reciprocatory movement longitudinally of said support, each finger including a serrated bar having an end section pivoted thereto and weighted outwardly of the pivotal connection, slides mounted on the support and connected with the respective picker fingers, guides for the fingers and slides, and means to impart a sufficiently rapid reciprocatory movement to the several sets of fingers sequentially; to cause the end sections of each set of fingers to approach each other at the outer end of their stroke and to recede from each other at the inner end of their stroke, due to inertia of said sections.

7. A cotton picker head comprising a tubular support, multiple sets of picker fingers mounted for reciprocatory movement longitudinally of said support, each finger including a serrated bar having an end section pivoted thereto and weighted outwardly of the pivotal connection, slides mounted on the support and connected with the respective picker fingers, guides for the fingers and slides, and means to impart a sufficiently rapid reciprocatory movement to the several sets of fingers sequentially; to cause the end sections of each set of fingers to approach each other at the outer end of their stroke and to recede from each other at the inner end of their stroke, due to inertia of said sections, said reciprocating means including a series of intermeshing gears mounted on the support, pitmen connecting the corresponding gears and slides, and a drive shaft geared to one of said gears.

8. A cotton picker head comprising a tubular support, a plurality of reciprocating fingers associated therewith, means for reciprocating said fingers, and a guard on the forward end of the head having a series of radial slots through which the ends of the picker fingers operate, the ends of the guard sections between the slots being inturned to form a central opening in the guard.

9. A cotton picker head comprising a tubular support, a plurality of reciprocating fingers associated therewith, means for reciprocating said fingers, guides for the fingers mounted on the support and including lateral flanges between which the finger ends operate, and a guard carried by the outer ends of the guides said guard having radial slots occupied by the guide flanges, the ends of the guard sections between the slots being returned to form a central opening in the guard.

10. A guard for the intake end of a tubular cotton picker head comprising a substantially conical plate having radial slots therein the ends of the plate sections between the slots being inturned to form a central opening in the guard.

11. A guard for the intake end of a tubular cotton picker head comprising a substantially conical plate having radial slots therein the ends of the plate sections between the slots being inturned to form a central opening in the guard, said plate having a flanged edge for attachment to the picker head.

In testimony whereof I affix my signature.

IRA E. McGEHEE.